(12) United States Patent
Chappell et al.

(10) Patent No.: US 10,797,522 B2
(45) Date of Patent: *Oct. 6, 2020

(54) MAGNETIC RESONANCE COUPLING ARRANGEMENT

(71) Applicant: Purdue Research Foundation, West Lafayette, IN (US)

(72) Inventors: William J. Chappell, Lafayette, IN (US); Dohyuk Ha, Lafayette, IN (US); Henry Mei, West Lafayette, IN (US); Pedro P. Irazoqui, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,543

(22) Filed: Aug. 7, 2018

(65) Prior Publication Data

US 2018/0375382 A1 Dec. 27, 2018

Related U.S. Application Data

(63) Continuation of application No. 14/728,976, filed on Jun. 2, 2015, now Pat. No. 10,044,227.

(Continued)

(51) Int. Cl.
*H01F 27/42* (2006.01)
*H01F 37/00* (2006.01)
(Continued)

(52) U.S. Cl.
CPC .............. *H02J 50/12* (2016.02); *H01F 38/14* (2013.01); *H02J 50/50* (2016.02)

(58) Field of Classification Search
CPC .. H02J 5/005; H02J 17/00; H02J 50/10; H02J 50/12; H02J 50/50; H01F 38/14
See application file for complete search history.

(56) References Cited

U.S. PATENT DOCUMENTS

| | | | |
|---|---|---|---|
| 10,044,227 B2 * | 8/2018 | Chappell | H02J 50/50 |
| 2010/0190435 A1 * | 7/2010 | Cook | H02J 5/005 455/41.1 |

(Continued)

*Primary Examiner* — Rexford N Barnie
*Assistant Examiner* — Rasem Mourad
(74) *Attorney, Agent, or Firm* — Purdue Research Foundation

(57) ABSTRACT

A wireless power transfer system is disclosed. The system includes a first resonator having a first resonant frequency $\omega_{o1}$, a half power bandwidth $\Delta\omega_1$, and an unloaded quality factor $Qo_1 = \omega_{o1}/\Delta\omega_1$ coupled through a first coupling circuit to a power source, a second resonator having a second resonant frequency $\omega_{o2}$, a half power bandwidth $\Delta\omega_2$, and an unloaded quality factor $Qo_2 = \omega_{o2}/\Delta\omega_2$ coupled through a second coupling circuit to a load, the first resonator disposed a distance away from the second resonator, wherein the distance is smaller than the first and second resonant wavelengths, the first and second coupling circuits are configured so that up to a maximum achievable power transfer efficiency between the first and second resonators can be achieved, wherein $Qo_1$ and $Qo_2$ can be less than 100.

9 Claims, 11 Drawing Sheets

Related U.S. Application Data

(60) Provisional application No. 62/006,807, filed on Jun. 2, 2014.

(51) Int. Cl.
*H01F 38/00* (2006.01)
*H02J 50/12* (2016.01)
*H01F 38/14* (2006.01)
*H02J 50/50* (2016.01)

(56) References Cited

U.S. PATENT DOCUMENTS

2010/0277120 A1* 11/2010 Cook .................... H02J 50/12
                                                      320/108
2015/0180265 A1*  6/2015 Chiang .................. H02J 50/10
                                                      320/108

* cited by examiner

MAGNETIC RESONANCE COUPLING ARRANGEMENT

CROSS-REFERENCE TO RELATED APPLICATIONS

The present application is a continuation of U.S. non-provisional application Ser. No. 14/728,976, filed Jun. 2, 2015 which claims the benefit of priority to U.S. provisional application Ser. No. 62/006,807, filed Jun. 2, 2014, the contents of which are hereby incorporated by reference in their entirety.

STATEMENT OF GOVERNMENT SUPPORT

This invention was made with government support under N66001-12-1-4029 awarded by the Defense Advanced Research Projects Agency. The government has certain rights in the invention.

TECHNICAL FIELD

The present disclosure relates to the field of magnetic and electrical coupling and in particular to resonant coupling between resonators for wireless energy transfer.

BACKGROUND

This section introduces aspects that may help facilitate a better understanding of the disclosure. Accordingly, these statements are to be read in this light and are not to be understood as admissions about what is or is not prior art.

Wireless power transfer (WPT) technologies are gaining increased popularity as they address key limitations associated with "tethered" and battery operated consumer and medical electronics including miniaturization, cost, and safety. Traditionally, WPT techniques are based on near-field magnetic induction or far-field radiofrequency radiation. Far-field techniques offer the capability to wirelessly power over a large coverage area but have low end-to-end efficiency due to high material electromagnetic (EM) interaction and $1/r^2$ power density dependence. In contrast, near-field magnetic induction can operate at high efficiency but only within centimeter ranges. Recently, the development of magnetic resonance coupling (MRC) has gained momentum as a promising WPT method due to its capability of operating at much longer distances than traditional inductive methods while maintaining higher end-to-end power transfer efficiency than far-field radiative techniques. In addition, MRC systems demonstrate capabilities of power "relaying" and preferentially designed power distribution to multiple loads, features of which do not exist in traditional induction and far-field techniques. However, practical implementation of MRC has been challenging. Conventional MRC requires a minimum of four inductively coupled coils to generate the resonant structure of which the optimization parameters are difficult to control and are difficult to miniaturize. Furthermore, the coupled-mode theory and equivalent circuit model derived design equations are overly complex and become impractical as a design guide especially when incorporating "relay" coils and power distribution to multiple loads. Other methods utilizing direct coupled methods and impedance matching networks have been presented. However, among the current technology, there does not exist a unified and simple approach for achieving the optimal IM solution in MRC systems. This is especially apparent as systems become overly complex due to the addition of relay resonators.

Therefore, there is an unmet need for a novel arrangement and methodology in WPT utilizing MRC that allows for simple IM optimization and flexible design that can be reconfigured for when relay coils are being added.

SUMMARY

A wireless power transfer system is disclosed. The system includes a first resonator having a first resonant frequency $\omega_{o1}$, a half power bandwidth $\Delta\omega_1$, and an unloaded quality factor $Qo_1=\omega_{o1}/\Delta\omega_1$ coupled through a first coupling circuit to a power source. The system further includes a second resonator having a second resonant frequency $\omega_{o2}$, a half power bandwidth $\Delta\omega_2$, and an unloaded quality factor $Qo_2=\omega_{o2}/\Delta\omega_2$ coupled through a second coupling circuit to a load, the first resonator disposed a distance away from the second resonator, wherein the distance is smaller than the first and second resonant wavelengths. The first and second coupling circuits are configured so that up to a maximum achievable power transfer efficiency between the first and second resonators can be achieved, wherein $Qo_1$ and $Qo_2$ can be less than 100.

A method of providing a maximum wireless power transfer efficiency between a first resonator and a second resonator is also disclosed. The method includes providing a first resonator having a first resonant frequency $\omega_{o1}$, a half power bandwidth $\Delta\omega_1$, and an unloaded quality factor $Qo_1=\omega_{o1}/\Delta\omega_1$ coupled through a first coupling circuit to a power source. The method also includes providing a second resonator having a second resonant frequency $\omega_{o2}$, a half power bandwidth $\Delta\omega_2$, and an unloaded quality factor $Qo_2=\omega_{o2}/\Delta\omega_2$ coupled through a second coupling circuit to a load, the first resonator disposed a distance away from the second resonator, wherein the distance is smaller than the first and second resonant wavelengths. The method further includes configuring the first and second coupling circuits so that up to a maximum power transfer efficiency between the first and second resonators can be achieved, wherein $Qo_1$ and $Qo_2$ can be less than 100.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

Figure 1:
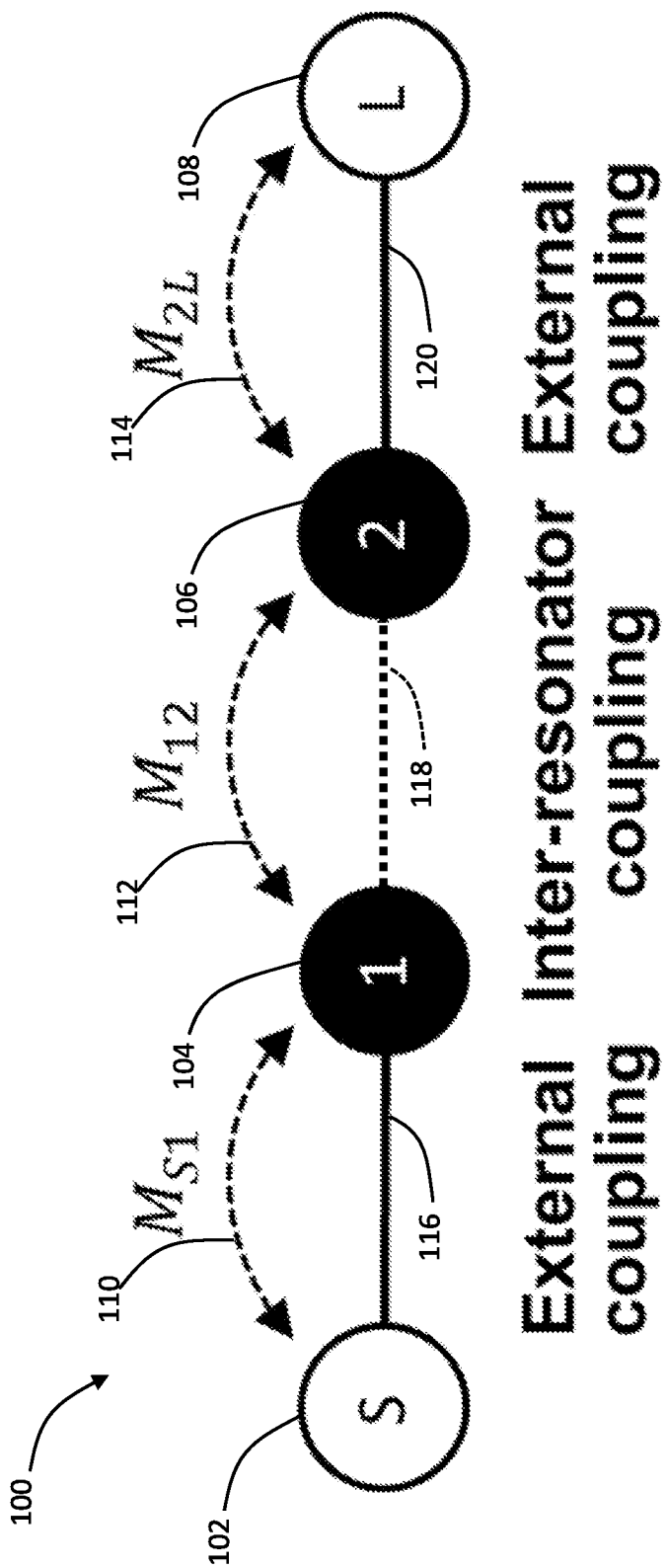
FIG. 1 is a schematic representation of a magnetic resonance coupling (MRC) circuit according to the present disclosure.

The attached drawings are for purposes of illustration and are not necessarily to scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, an alternative method to achieving wireless power transfer (WPT) via magnetic resonance coupling MRC, based on a bandpass filter (BPF) synthesis methodology is disclosed to address the aforementioned challenges of conventional MRC while also providing added functionality in the form of arbitrary load impedance matching. In contrast with conventional four coil MRC, BPF synthesized MRC shrinks to only a two-coil resonant structure. This shrinking is accomplished via impedance transformation using passive lumped component immitance inverters (or otherwise identified as K-inverter), thus, resulting in a more compact and controllable system. The filter design equations as applied to MRC are concise and can be solved mathematically to predict and control the frequency and coupling response phenomena unique to resonantly coupled circuits. In addition, the parameter optimization procedures in BPF synthesized MRC shows practical advantages over conventional MRC systems. For example, maximizing power transfer dynamically over coil misalignment and separation can be achieved via adaptive tuning of the characteristic impedance of the immitance inverters e.g. changing capacitance values. From this point a designer can utilize any lumped element network that is a K-inverter network and achieve optimal or maximum achievable PTE by manifesting the optimally derived characteristic impedance of the system. This is significantly more practical than adaptive tuning in conventional MRC which typically requires system level tuning such as optimization of coil coupling coefficients which is both difficult to accomplish physically, difficult to measure, and is highly variable.

The designs of the K-inverters are based on developing a general source and load n±2 coupling matrix. Relevant design equations are then derived from this coupling matrix and used to optimize and maximize wireless power transfer given a pre-determined coupling coefficient between the transmit and receive coils. Addition of relay coils and/or multiple received devices require simply updating the n±2 coupling matrix and re-deriving the design equations or doing so numerically and implementing the optimization procedure used for a system of only 2 resonators. In addition, arbitrary load impedance matching can also implemented and also only requires updating the n±2 coupling matrix and re-deriving the relevant design equations from this coupling matrix.

In the present disclosure, resonators may be shown as RLC circuits, however, other types of resonators are possible, including but not limited to cavity, mechanical, optical, fluid, etc. In each case, the resonant frequency $\omega_r$ of the resonator is a physical characteristic associated with the resonator. A half-power bandwidth $\Delta\omega$, represents bandwidth over which the power of vibration is greater than half the power at the resonant frequency. Quality factor of the resonator, defined in alternative ways in this document, is defined in one sense as $\omega_r/\Delta\omega$.

Referring to FIG. 1, a MRC arrangement 100 according to the present disclosure is provided. The arrangement 100 includes a source 102, a first resonator 104, a second resonator 106, and a load 108. The source 102 is electrically coupled to the first resonator 104 via an electrical coupling link 116. There is also a normalized coupling coefficient identified by $M_{S1}$ 110 between the source 102 and the first resonator 104. The load 108 is electrically coupled to the second resonator 106 via an electrical coupling link 120. There is also a normalized coupling coefficient identified by $M_{2L}$ 114 between the load 108 and the second resonator 106. There is also a normalized coupling coefficient identified by $M_{12}$ 112 between the first resonator 104 and the second resonator 106. Finally there is an inter-resonator coupling (later identified as $k_{12}$) identified as 118 between the first resonator 104 and the second resonator 106.

Figure 2A:
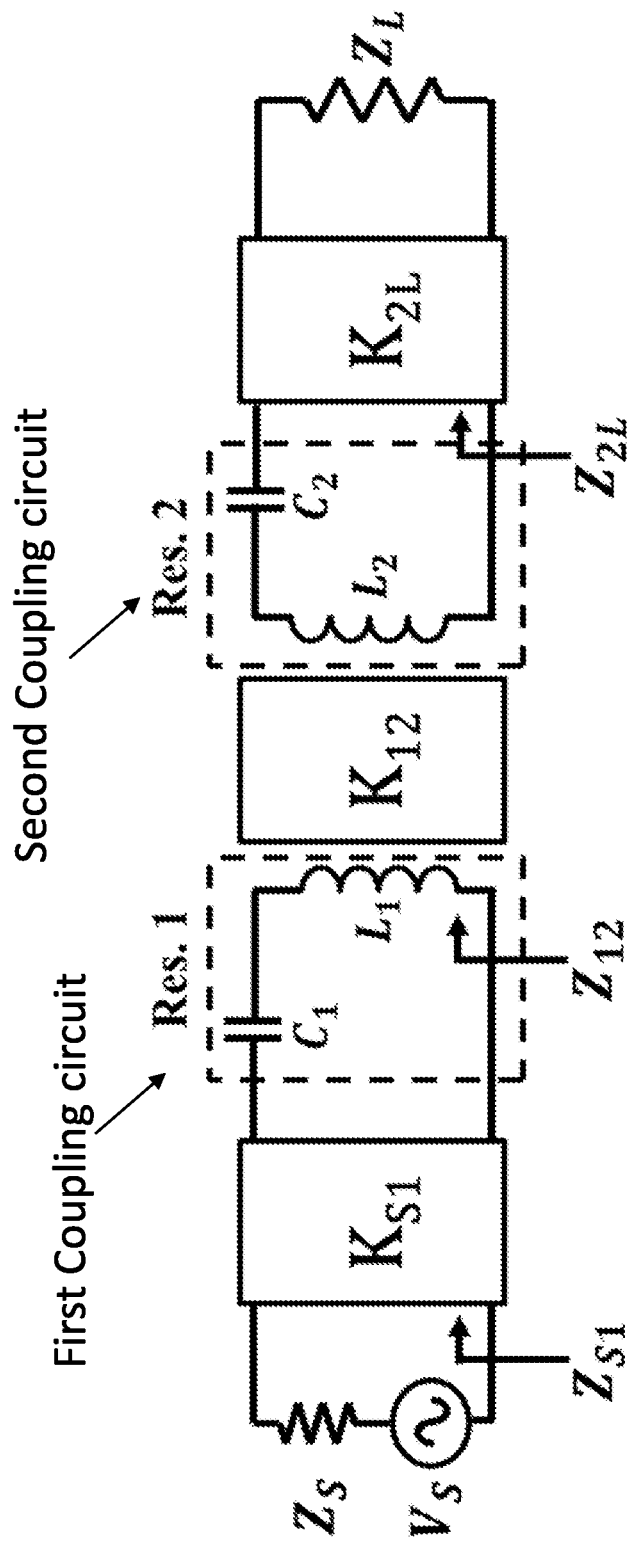
FIG. 2a is another schematic representation of a MRC circuit according to the present disclosure.

Referring to FIG. 2a, another schematic of a detailed model of an equivalent BPF modeled MRC system is provided. On the left hand side there is a source $V_s$ with a source impedance $Z_s$ interfacing with a first k-inverter $K_{s1}$ that is then coupled to a first resonator Res. 1 having lumped parameter characteristics $C_1$ and $L_1$. Input impedance looking into $K_{S1}$ equals $Z_{S1}$. Inter-resonator magnetic coupling between the first resonator Res.1 and a second resonator Res.2 is identified as $K_{12}$. On the right hand side there is a load with a load impedance $Z_L$ interfacing with a second k-inverter $K_{2L}$ that is then coupled to the second resonator Res. 2 having lumped parameter characteristics $C_2$ and $L_2$.

Figure 2B:
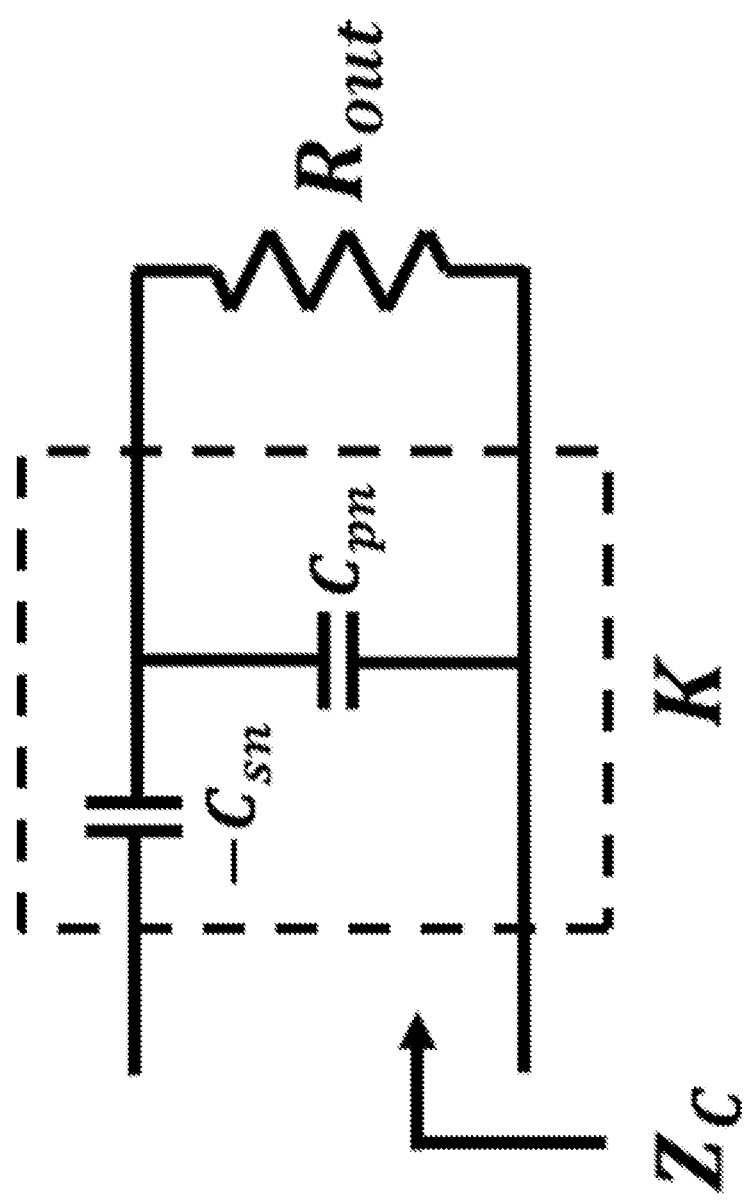
FIG. 2b is a schematic of a lumped element capacitive K-inverter network exhibiting a characteristic impedance K, input impedance $Z_C$ and real output impedance, $R_{out}$.

Referring to FIG. 2b, a lumped element capacitive K-inverter network exhibiting a characteristic impedance K, input impedance $Z_C$ and real output impedance, $R_{out}$ is provided.

Figure 3:
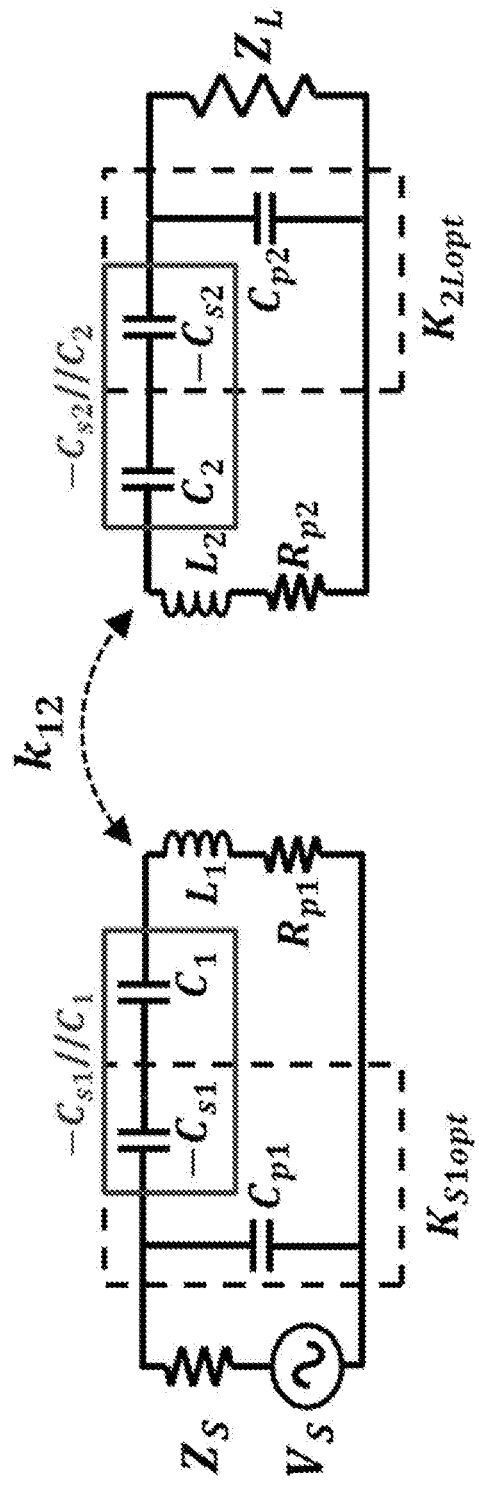
FIG. 3 is yet another schematic representation of a MRC circuit according to the present disclosure.

Referring to FIG. 3, another schematic of a detailed model of an equivalent BPF modeled MRC system is provided. On the left hand side there is a source $V_s$ with a source impedance $Z_s$ interfacing with a first k-inverter $K_{s1opt}$ that is then coupled to a first resonator Res. 1 having lumped parameter characteristics $C_1$, $L_1$, and parasitic resistance $R_{p1}$. The first k-inverter includes a capacitive network of $C_{p1}$ and $-C_{s1}$, where $-C_{s1}$ and $C_1$ combine to provide a capacitive equivalent $C_{1s1}$. Inter-resonator magnetic coupling between the first resonator Res.1 and a second resonator Res.2 is identified as $K_{12}$. On the right hand side there is a load with a load impedance $Z_L$ interfacing with a second k-inverter $K_{2Lopt}$ that is then coupled to the second resonator Res. 2 having lumped parameter characteristics $C_2$, $L_2$, and patristic resistance $R_{p2}$. The second k-inverter includes a capacitive network of $C_{p2}$ and $-C_{s2}$, where $-C_{s2}$ and $C_2$ combine to provide a capacitive equivalent $C_{2s2}$. The capacitive networks $C_{p1}$, $-C_{s1}$, $C_{p2}$, and $-C_{s2}$ are configured such that the system will exhibit $K_{S1opt}$ and $K_{2Lopt}$ characteristic impedances, (which are uniquely derived from the methodology described herein). This will enable maximum achievable PTE for the given resonator parameters and desired inter-resonator coupling coefficient.

In typical WPT applications, inductors $L_1$ and $L_2$ are fixed according to the coil design and physical dimensions at a pre-specified $\omega_0$. Thus, the resonant frequency of the system can be set by choosing series capacitors $C_1$ and $C_2$ accordingly, based on:

$$\omega_0 = 2\pi f_0 = \frac{1}{\sqrt{L_1 C_1}} = \frac{1}{\sqrt{L_2 C_2}}$$

The generic matched condition for a lossless ($Q_{0n}=\infty$) 2-stage BPF occurs when input impedance $Z_{S1}$ is the complex conjugate of $Z_S$. In the present disclosure, the source and load impedances, $Z_S$ and $Z_L$ respectively, are fixed to 50Ω to enable convenient measurement with standard 50Ω testing equipment. The relationships between impedances $Z_{s1}$ $Z_{12}$, $Z_{2L}$ (See FIG. 2a) can be determined by applying $$Z_{in} = \frac{K^2}{Z_L},$$

at each K-inverter, wherein $Z_{in}$ is the input impedance looking into the K-inverter network, K is the real valued characteristic impedance of the inverter, and $Z_L$ is the load impedance. The resulting matched condition for a lossless system (i.e., infinite Q) can be shown to be $$K_{12}Z_S = K_{S1}K_{2L}$$

The inter-resonator K-inverter characteristic impedance, $K_{12}$, is directly related to the inter-resonator coupling coefficient, $k_{12}$. The generic BPF IM method, for lossless MRC systems, is realized by manifesting arbitrarily chosen values of $K_{S1}$ and $K_{2L}$ which result in the equivalency described by $K_{12}Z_S = K_{S1}K_{2L}$. However, the ambiguity in choosing values $K_{S1}$ and $K_{2L}$ does not lead to the optimal IM conditions, which are unique based on the resonator parameters including resonator Q. The source and load included coupling matrix is a convenient and powerful tool commonly used in BPF design and analysis.

The BPF modeled MRC system shown in FIG. 2a can be generalized as a maximally flat 2-pole (n=2) Butterworth BPF with source and load included external couplings. This system can be conveniently described by its coupling topology which is illustrated in FIG. 1. Using FIG. 1, the coupling matrix for the 2-stage BPF modeled MRC system can be easily determined as $$[M] = \begin{matrix} & S & 1 & 2 & L \\ S & 0 & M_{S1} & 0 & 0 \\ 1 & M_{S1} & -jM_{11} & M_{12} & 0 \\ 2 & 0 & M_{12} & -jM_{22} & M_{2L} \\ L & 0 & 0 & M_{2L} & 0 \end{matrix}$$

where $j=\sqrt{-1}$, subscripts S and L represent the source and load respectively, and subscripts 1 and 2 represent the first and second resonator, respectively. This coupling matrix can be extended to include N>2 resonators for the purposes of power relay capabilitiy. The M values of the above matrix represent the normalized coupling coefficients of the system. In particular, $M_{S1}$ and $M_{2L}$ are the normalized external couplings between the source to resonator 1 and resonator 2 to load respectively. Normalized coupling coefficients $M_{11}$ and $M_{22}$ represent the normalized self-coupling terms of resonator 1 and 2 respectively and is related to $Q_{0n}$ of each resonator by $$M_{11} = \frac{1}{FBW Q_{01}}$$

$$M_{22} = \frac{1}{FBW Q_{02}}$$

where FBW is the fractional bandwidth of the filter and is defined as $$FBW = \frac{\omega_2 - \omega_1}{\omega_0}$$

where $\omega_2 - \omega_1$ is the 3 dB passband-edge angular frequency of the BPF prototype MRC model. Typically, FBW is defined by the desired requirements of the BPF.

The unloaded Q factor of each series LC resonator can be determined as $$Q_{0n} = \frac{\omega_0 L_n}{R_{Pn}}$$

where $R_{Pn}$ is the frequency dependent equivalent series resistance (ESR) of the coil inductors. The values of $M_{11}$ and $M_{22}$ can be determined through measurement of resonator $Q_{0n}$.

M-parameter, $M_{12}$, represents the normalized inter-resonator coupling coefficient which is given by $$M_{12} = \frac{k_{12}}{FBW}$$

From BPF theory, it can be shown that $M_{S1}$, $M_{12}$, and $M_{2L}$ are directly related to the characteristic impedance of each K-inverter for the 2-stage BPF modeled MRC system shown in FIG. 2a. Assuming a fixed 50Ω source and load impedance, these relationships are given by $$K_{S1} = M_{S1}\sqrt{50 L_1 \omega_0 FBW}$$

$$K_{12} = FBW\, \omega_0 M_{12}\sqrt{L_1 L_2}$$

$$K_{2L} = M_{2L}\sqrt{50 L_2 \omega_0 FBW}$$

The transfer response for the 2-Stage BPF Modeled MRC can be computed directly from the M-matrix in terms of the scattering parameters by $$S_{21} = -2j[A]_{n+2,1}^{-1}$$

$$S_{11} = 1 + 2j[A]_{1,1}^{-1}$$

where matrix [A] is given by $$[A] = [M] + \Omega[U] - j[q]$$

where $$\Omega = \frac{1}{FBW}\left(\frac{\omega}{\omega_0} - \frac{\omega_0}{\omega}\right)$$

and $$[U] = \begin{bmatrix} 0 & 0 & 0 & 0 \\ 0 & 1 & 0 & 0 \\ 0 & 0 & 1 & 0 \\ 0 & 0 & 0 & 0 \end{bmatrix}, [q] = \begin{bmatrix} 1 & 0 & 0 & 0 \\ 0 & 0 & 0 & 0 \\ 0 & 0 & 0 & 0 \\ 0 & 0 & 0 & 1 \end{bmatrix}$$

The $S_{11}$ and $S_{21}$ parameters are the power reflection and transmission ratios, respectively. It is important to note that in the present disclosure, power transfer efficiency (PTE) is defined as the wireless transmission efficiency which does not include the power loss due to the impedance of a power source. Specifically, this PTE is related to $S_{21}$ by $$PTE = |S_{21}|^2 \times 100$$

$$S_{21} = \frac{2jM_{S1}M_{12}M_{2L}}{M_{12}^2 + (M_{S1}^2 + M_{11} + j\Omega)(M_{22} + M_{2L}^2 + j\Omega)}$$

taking the magnitude at $\omega_0$ ($\Omega=0$) simplifies the above equation to:

$$|S_{21}|_{\omega=\omega_0} = \frac{2M_{12}M_{2L}M_{S1}}{M_{12}^2 + (M_{22} + M_{2L}^2)(M_{11} + M_{S1}^2)}$$

This equation fully describes the power transmission topology of the 2-stage BPF modeled in the present disclosure. In order to find the maximum power transfer efficiency, a partial derivative of the above equation is obtained with respect to $M_{S1}$ and $M_{2L}$. By inspection, $M_{11}$, $M_{12}$, and $M_{22}$ are known constants determined by the resonator parameters ($M_{11}$ and $M_{22}$) and the specified inter-resonator coupling coefficient, $k_{12}$ ($M_{12}$) at which optimal IM is desired to occur. This targeted inter-resonator coupling value is redefined as $k_{12tgt}$. Likewise, $M_{12}$ is redefined as $M_{12tgt}$.

To determine the optimal $M_{S1}$ and $M_{2L}$ functions, the partial derivative of (26) is taken with respect to (w.r.t) $M_{S1}$ and $M_{2L}$. Both partial derivative functions are set to equal zero (indicating global maximum). This yields two equations with two unknowns, the optimal $M_{S1}$ and $M_{2L}$ values, redefined as $M_{S1opt}$ and $M_{2Lopt}$. By solving the systems of two equations, the $M_{S1opt}$ and $M_{2Lopt}$ functions are derived to be $$M_{S1opt} = \frac{M_{11}^{1/4}(M_{12tgt}^2 + M_{11}M_{22})^{1/4}}{M_{22}^{1/4}}$$

$$M_{2Lopt} = \frac{M_{22}^{1/4}(M_{12tgt}^2 + M_{11}M_{22})^{1/4}}{M_{11}^{1/4}}$$

Using $$M_{11} = \frac{1}{FBWQ_{01}}, M_{22} = \frac{1}{FBWQ_{02}}, \text{ and } M_{12} = \frac{k_{12}}{FBW},$$

$S_{11} = 1 + 2j[A]_{1,1}^{-1}$ can be simplified to $$M_{S1opt} = \left(\frac{1 + k_{12tgt}^2 Q_{01}Q_{02}}{FBW^2 Q_{01}^2}\right)^{1/4}$$

$$M_{2Lopt} = \left(\frac{1 + k_{12tgt}^2 Q_{01}Q_{02}}{FBW^2 Q_{02}^2}\right)^{1/4}$$

which represent the global optimum normalized external coupling M-matrix values. As shown, $M_{S1opt}$ and $M_{2Lopt}$ can be determined analytically as functions of the unloaded $Q_{0n}$ of the resonators and the targeted location, $k_{12tgt}$, at which the optimal IM is desired to occur.

The above equations can be substituted in to $K_{S1}=M_{S1}\sqrt{50L_1\omega_0 FBW}$ and $K_{2L}=M_{2L}\sqrt{50L_2\omega_0 FBW}$ resulting in the determination of global optimum external coupling characteristic impedance functions no redefined as $K_{S1opt}$ and $K_{2Lopt}$ as follows:

$$K_{S1opt} = (1 + k_{12tgt}^2 Q_{01}Q_{02})^{1/4}\sqrt{\frac{50L_1\omega_0}{Q_{01}}}$$

$$K_{2Lopt} = (1 + k_{12tgt}^2 Q_{01}Q_{02})^{1/4}\sqrt{\frac{50L_2\omega_0}{Q_{02}}}$$

Therefore, for a known $C_1$, $L_1$, $R_{p1}$ and $C_2$, $L_2$, and $R_{p2}$, $$\omega_0 = 2\pi f_0 = \frac{1}{\sqrt{L_1 C_1}} = \frac{1}{\sqrt{L_2 C_2}}$$

$$Q_{0n} = \frac{\omega_0 L_n}{R_{Pn}}$$

$k_{12tgt}$ is measured, thus $k_{s1opt}$ and $k_{2Lopt}$ can be found from the above equations. With $k_{s1opt}$ and $k_{2Lopt}$ parameters in hand, referring back to FIG. 2a, the input impedance of a K-inverter is expressed as $$Z_{in} = \frac{K^2}{Z_L},$$

where $Z_{in}$ is the input impedance looking into the K-inverter network, K is the real valued characteristic impedance of the inverter, and $Z_L$ is the load impedance.

However, before we can determine $-C_{sn}$ and $C_{pn}$, we need to revisit FIG. 2a. A cursory analysis of the ABCD matrix for a quarter-wave transmission line leads to the ABCD matrix describing K-inverters, which is given by $$\begin{bmatrix} A & B \\ C & D \end{bmatrix} = \begin{bmatrix} 0 & \pm jK \\ \mp \frac{j}{K} & 0 \end{bmatrix}$$

The input impedance, $Z_C$, of the K-inverter circuit in FIG. 2b is given by $$Z_C = \frac{R_{out}}{1 + C_{pn}^2 R_{out}^2 \omega_0^2} + j\left(\frac{1}{C_{sn}\omega_0} - \frac{C_{pn}\omega_0}{\frac{1}{R_{out}^2} + C_{pn}^2\omega_0^2}\right)$$

where $\omega_0$ is the operating angular frequency. Using the above equation, the relationships of $-C_{sn}$ and $C_{pn}$ to the K-inverter characteristic impedance, K, can be determined. Specifically, this is done by equating (3) with the inversion relationship of a K-inverter described by $$\begin{bmatrix} A & B \\ C & D \end{bmatrix} = \begin{bmatrix} 0 & \pm jK \\ \mp \frac{j}{K} & 0 \end{bmatrix}.$$

Recall that the characteristic impedance of a K-inverter is real valued. Thus, by using the relationships given by $$\text{Re}\{Z_C\} = \frac{K^2}{R_{out}}$$

$$\text{Im}\{Z_C\} = 0$$

Thus the capacitances $-C_{sn}$ and $C_{pn}$ can be solved as follows:

$$-C_{sn} = \frac{R_{out}}{K\omega_0 \sqrt{-K^2 + R_{out}^2}}$$

$$C_{pn} = \frac{\sqrt{-K^2 + R_{out}^2}}{R_{out} K \omega_0}$$

By placing the $K_{S1opt}$ and $K_{2Lopt}$ into the $-C_{sn}$ and $C_{pn}$ equations above, $-C_{sn}$ and $C_{pn}$ can be determined to provide the optimum impedance matching and hence the optimum PTE.

To determine the effect tuning $k_{12tgt}$ has on the optimal PTE response at $\omega=\omega_0$ as a function of resonator separation distance/angular misalignment; represented through resonator coupling coefficient, $k_{12}$, the following analysis is provided. The determination of optimal external characteristic impedances of the 2-stage BPF modeled MRC system requires the resonator parameters and a specification on the desired resonator coupling point, $k_{12tgt}$, at which optimal IM is to occur. The effect $k_{12tgt}$ has on the optimal PTE response as a function of $k_{12}$ can be determined by modifying $$|S_{21}|_{\omega=\omega_0} = \frac{2M_{12}M_{2L}M_{S1}}{M_{12}^2 + (M_{22} + M_{2L}^2)(M_{11} + M_{S1}^2)}.$$

Specifically, $M_{S1opt}$ and $M_{2Lopt}$ are substituted in place of $M_{S1}$ and $M_{2L}$. Variables, $M_{11}$, $M_{22}$, and $M_{12}$ are left unchanged arriving at:

$$|S_{21}|_{opt\_k} = \frac{2Q_{01}Q_{02}k_{12}\sqrt{\frac{1 + k_{12tgt}^2 Q_{01}Q_{02}}{Q_{01}Q_{02}}}}{2 + k_{12tgt}^2 Q_{01}Q_{02} + k_{12}^2 Q_{01}Q_{02} + 2\sqrt{1 + k_{12tgt}^2 Q_{01}Q_{02}}}$$

Figure 4:
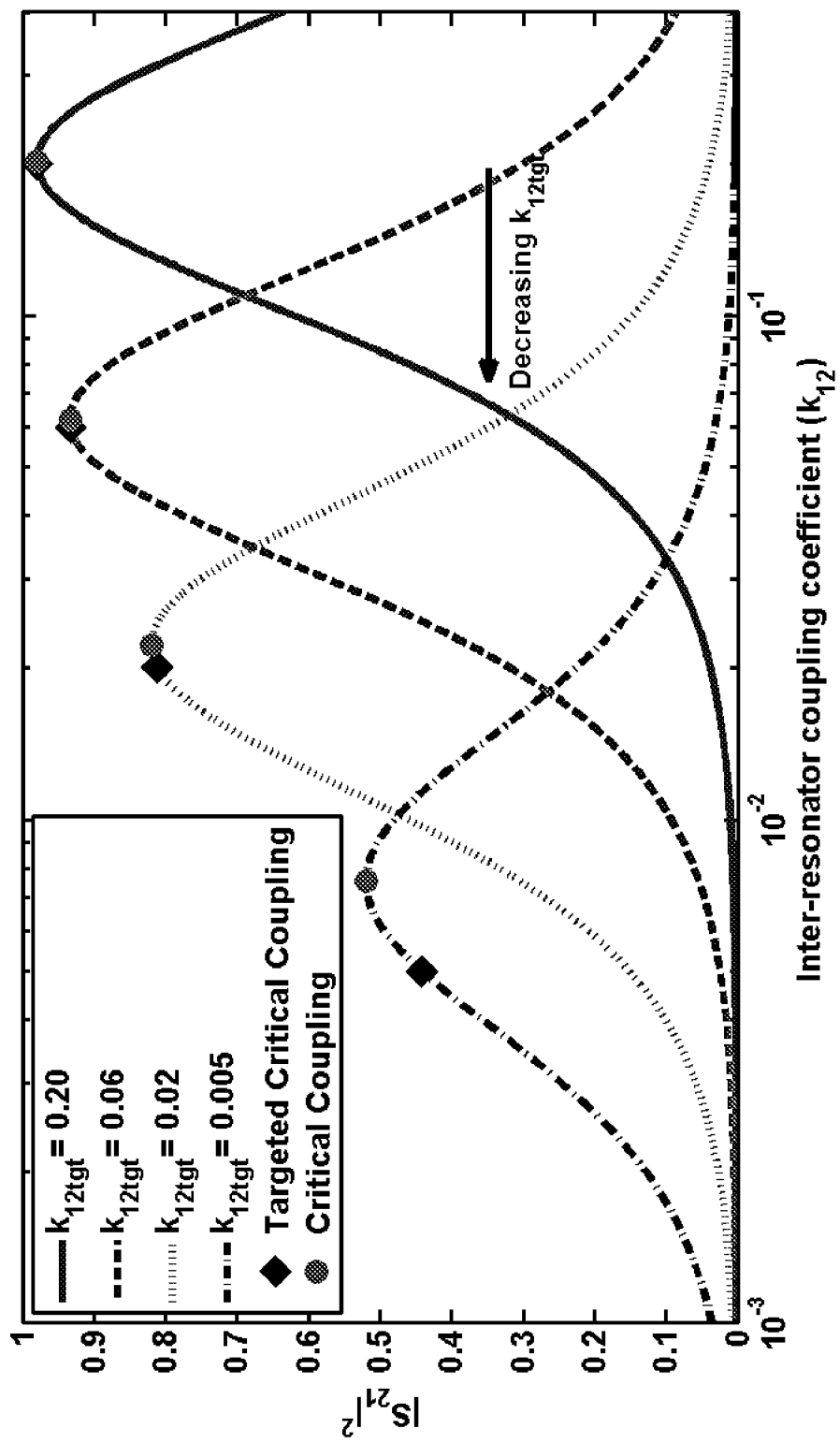
FIG. 4 is a graph of power transfer efficiency (PTE) response as a function of inter-resonator coupling (which represents coil separation distance/misalignment) for a single value of Q1=Q2=475.

FIG. 4 shows the plotted results of the above equation as a function of a $k_{12}$ range and four example values of $k_{12tgt}$ values. FIG. 4 is a representation of the PTE response as a function of inter-resonator coupling (which represents coil separation distance/misalignment) for a single value of $Q1=Q2=475$. Each curve represents a different $k_{12tgt}$ point in the optimal IM method. For example: if it is known that the resonators are going to be 4 cm apart and it is known that 4 cm apart corresponds to a $k_{12}$ value of 0.02, then the IM network can be optimized by making $k_{12tgt}=0.02$. This will result in the corresponding PTE vs. $k_{12}$ response shown in FIG. 4, for $k_{12tgt}=0.02$. The unloaded Q-factors, $Q_{01}$ and $Q_{02}$ are fixed to a value of 475. As shown, decreasing the value of $k_{12tgt}$ causes a corresponding shift in PTE response and the location of maximum achievable PTE. This point is known as the critical coupling point, $k_{12crit}$. The $k_{12}$ regions lower and higher than $k_{12crit}$ are characterized as the under-coupled and over-coupled regions, respectively. This tuning result indicates that minimizing $k_{12tgt}$ has the effect of maximizing range at the expense of maximum achievable PTE. For our BPF modeled MRC system, this tuning optimization and controllability can be accomplished in a practical manner as tuning the $k_{12tgt}$ value can be manifested through the analytically determined capacitance values for $-C_{sn}$ and $C_{pn}$ provided above. Referring to FIG. 4, theoretical PTE versus inter-resonator coupling coefficient, $k_{12}$, for various $k_{12tgt}$ tuning values at $\omega=\omega_0$ are provided.

Figure 8:
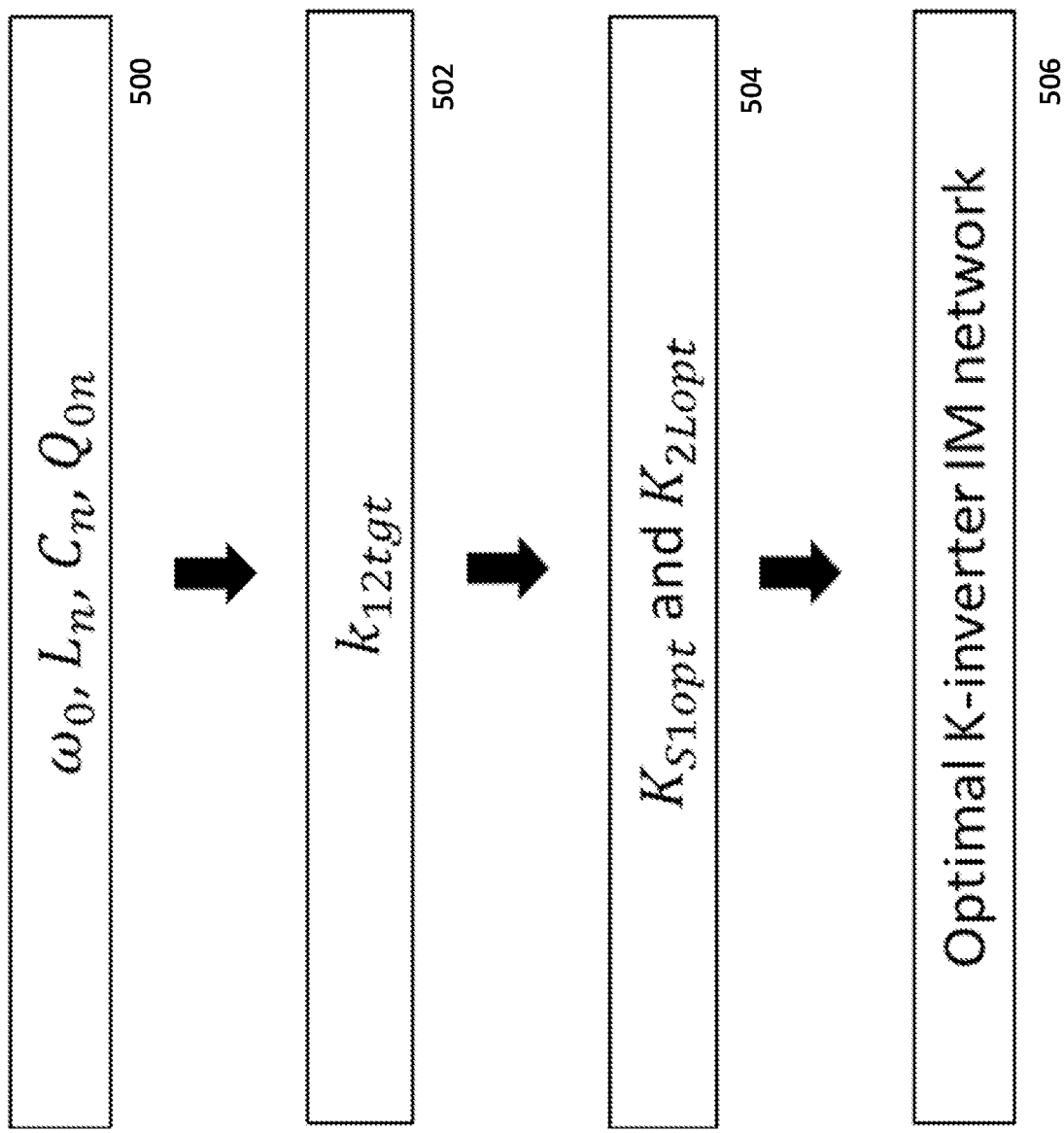
FIG. 8 is a flow chart of a method according to the present disclosure.

A unique system behavior can be observed upon examination of FIG. 8. Specifically, there is an observable discrepancy between the PTE at $k_{12}=k_{12tgt}$ (diamonds in FIG. 8) and $k_{12}=k_{12crit}$ point (dots in FIG. 4). Furthermore, the magnitude of discrepancy changes in relation to each $k_{12tgt}$ tuned PTE response. This phenomena indicates that the desired location of the critical coupling, ideally set by $k_{12tgt}$, deviates from the actual location, $k_{12crit}$.

Figure 5:
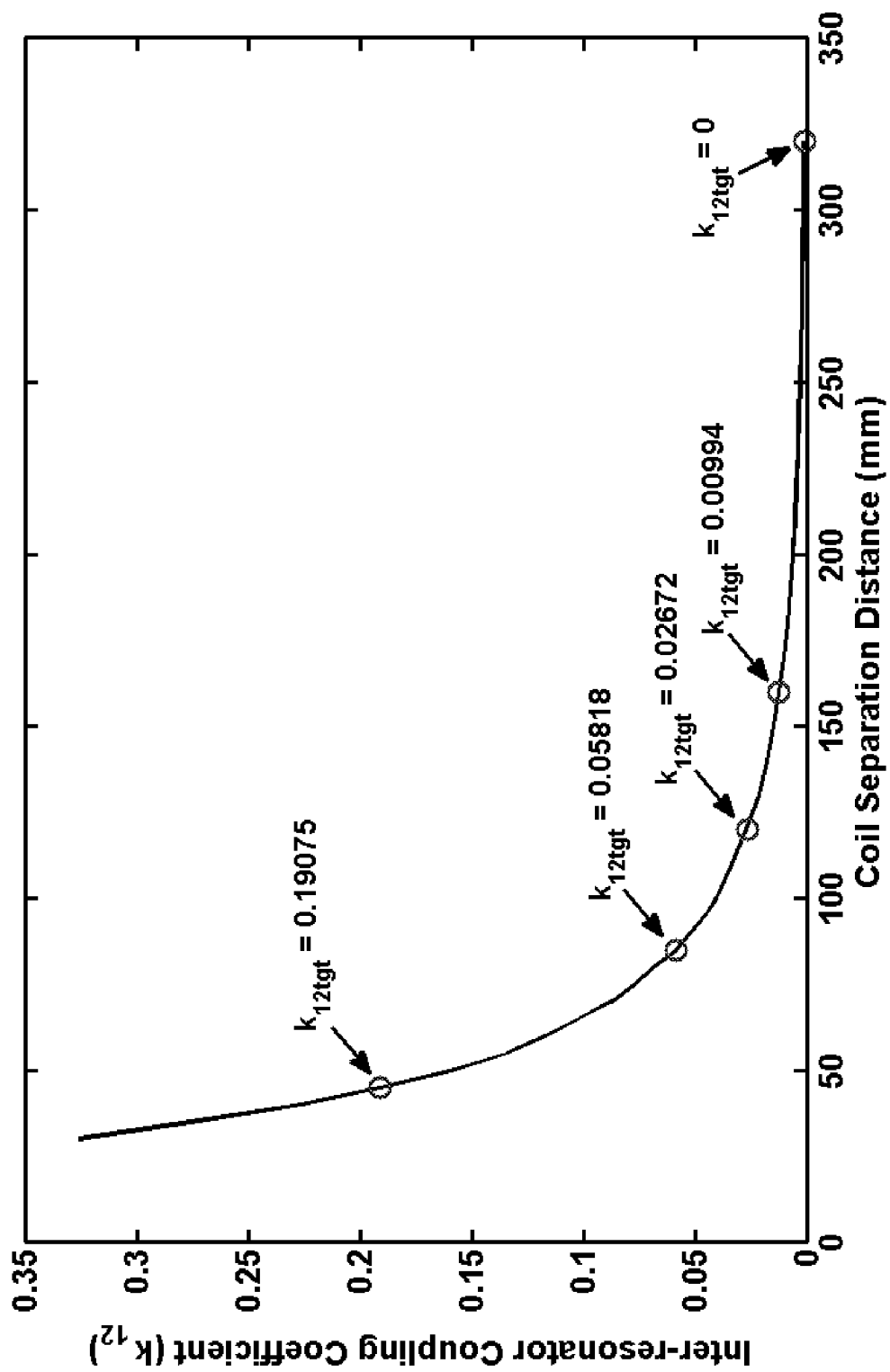
FIG. 5 is a graph of an inter-resonator coupling coefficient vs. coil separation (in mm).

Referring to FIG. 5, shows the measured range of $k_{12}$ between the fabricated coils as a function of resonator separation distance. The range of achievable $k_{12}$ was measured by obtaining the S-parameters of the coils through two port Vector Network Analyzer (VNA) measurements. The design parameters summarized in Table I and the specified $k_{12tgt}$ points in FIG. 5 are used to determine $K_{S1opt}$ and $K_{2Lopt}$ by equations for $K_{S1opt}$ and $K_{2Lopt}$, respectively. The corresponding optimal capacitance values are determined by substituting the specific $K_{S1opt}$ and $K_{2Lopt}$ values into equations for $-C_{sn}$ and $C_{pn}$ provided above.

TABLE I

| 1. Experimental resonator parameters | | |
|---|---|---|
| 2. Parameters | 3. Resonator 1 (Tx) | 4. Resonator 2 (Rx) |
| 5. $f_0$ | 6. 13.56 MHz | 7. 13.56 MHz |
| 8. $L_n$ | 9. 1410 nH | 10. 1460 nH |
| 11. $R_{pn}$ | 12. 0.2529 Ω | 13. 0.2619 Ω |
| 14. $Q_{0n}$ | 15. 475 | 16. 475 |
| 17. $C_n^*$ | 18. 97.702 pF | 19. 94.356 pF |

Figure 6:
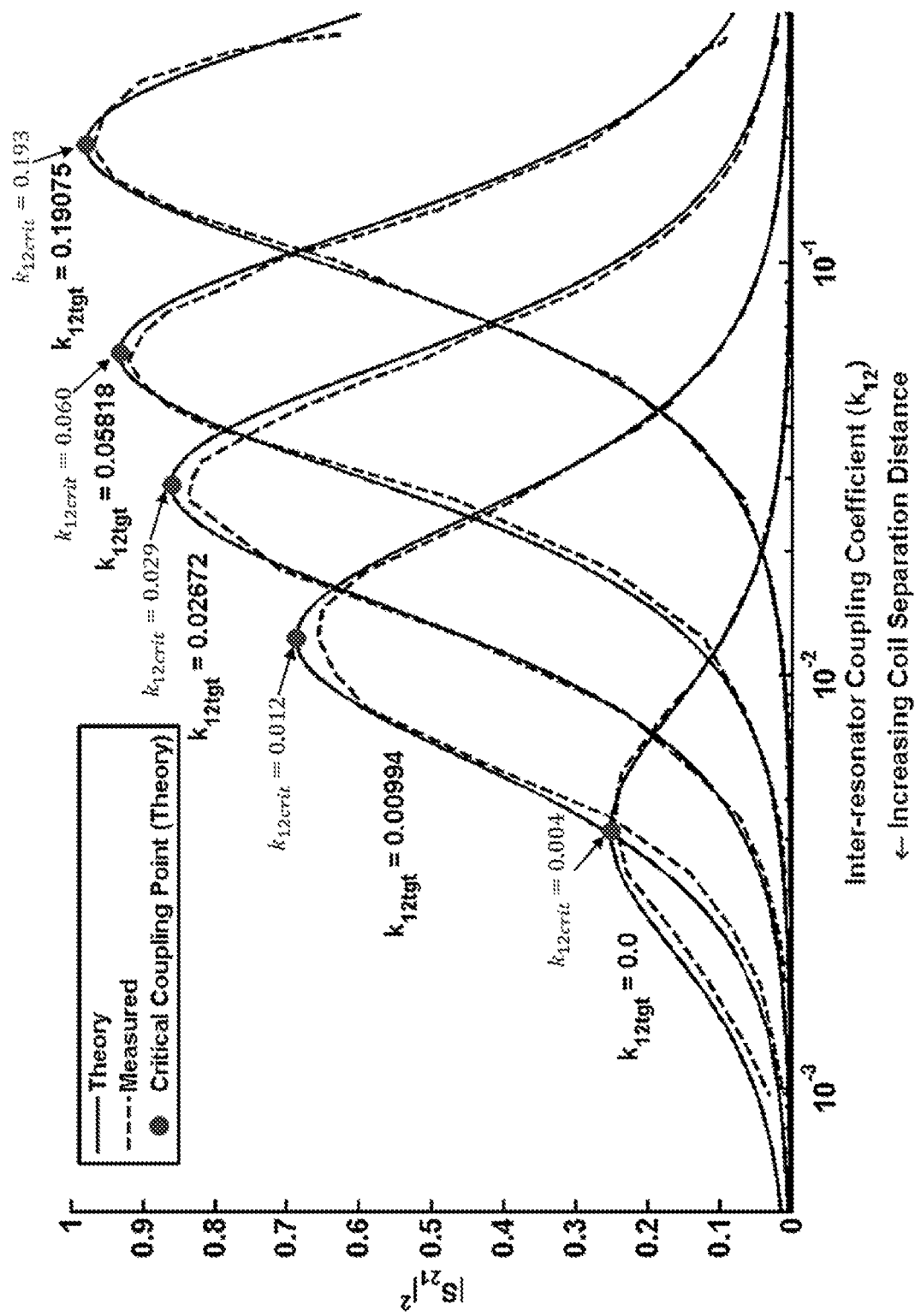
FIG. 6 is a graph of a measure of PTE vs. inter-resonator coupling coefficient.

Referring to FIG. 6, theoretical and measured resonant frequency PTE response plotted as a function of $k_{12}$. Each curve indicates a particular optimal IM design for the chosen $k_{12tgt}$ tuning point. The dot indicates the theoretically predicted critical coupling point.

FIG. 6 also shows the measured PTE responses at $\omega=\omega_0$ (13.56 MHz) as a function of $k_{12}$ (separation distance of 30 mm to 330 mm) for the 5 different optimal IM conditions based on the chosen $k_{12tgt}$ optimization points. Importantly, the measured PTE response and critical coupling point converge with the predicted results both in magnitude and location. A comparison of the $S_{11}$ response between the measured and circuit simulation was conducted to investigate the measurement and theory discrepancy shown in FIG. 6. This result indicates that slight deviation from the optimal capacitance values of the optimal IM networks are likely to blame for the discrepancy in PTE response shown in FIG. 6. This observation points to the importance of proper capacitance value tuning and minimization of PCB parasitic for achieving the optimal IM condition.

Figure 7:
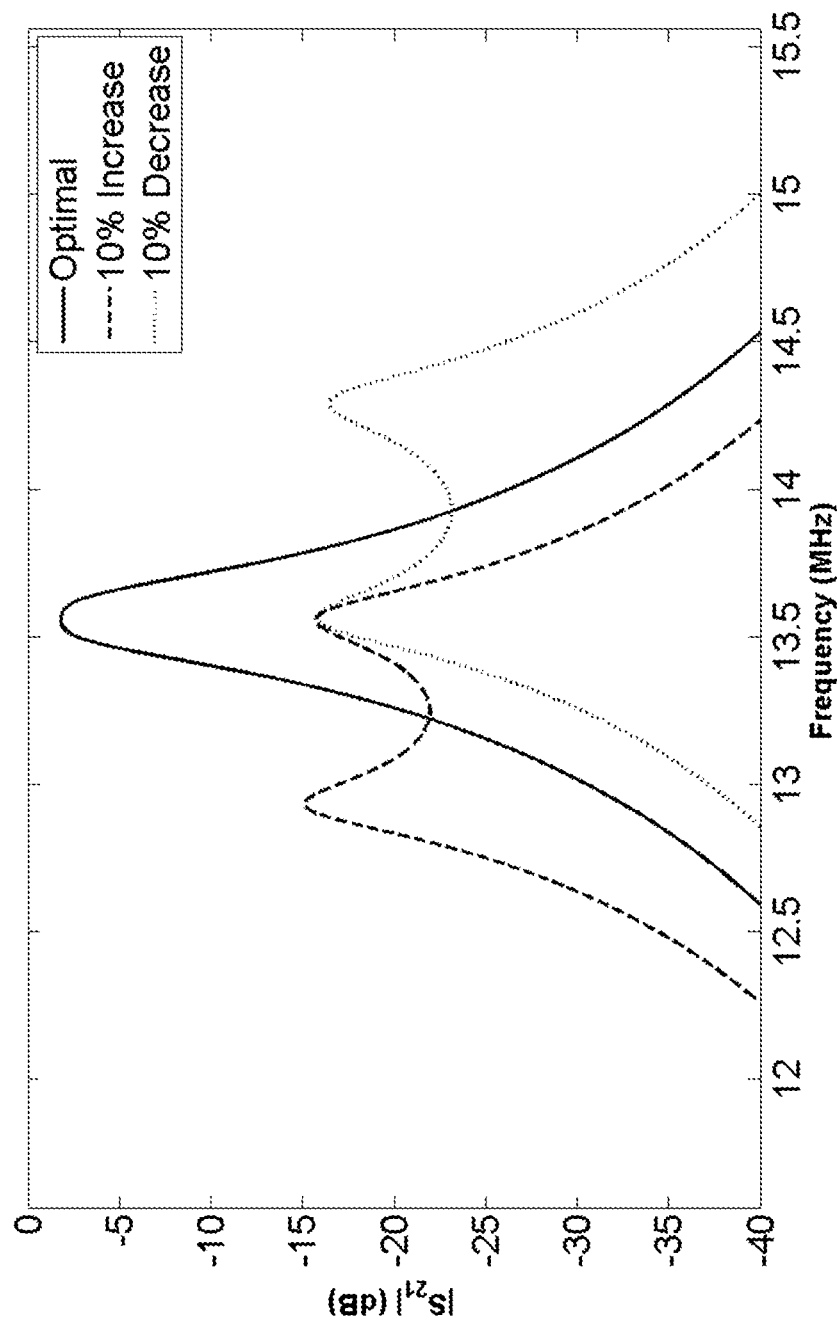
FIG. 7 is a graph of a simulation of PTE vs. frequency for different values of a capacitive network are increased and decreased from the optimum calculated value to show peak PTE at the optimal value for a particular value of $k_{12tgt}$ of 0.01.

Referring to FIG. 7, a graph of $|S_{21}|$ vs. frequency is depicted using the techniques of the present application to generate the solid line (optimal condition). The dashed lines indicate $K_{S1}$ (See FIG. 2a) increased and decreased by 10% from the optimal value. The change in the values indicate that there is a marked drop from the optimal condition by simply varying $K_{s1}$ by 10% in opposing directions.

Referring to FIG. 8, a flowchart for determining the optimal k-inverter values to arrive at the maximum PTE is provided. At step 500, various physical parameters of the resonators (two of them) are determined. Next, at step 502, inter-resonator coupling value $k_{12tgt}$ is determined. Next, at step 504, K values for S1opt and 2Lopt are calculated. Finally, at step 506, optimal k inverter IM network is calculated by determining $-C_{sn}$ and $C_{pn}$.

Figure 9:
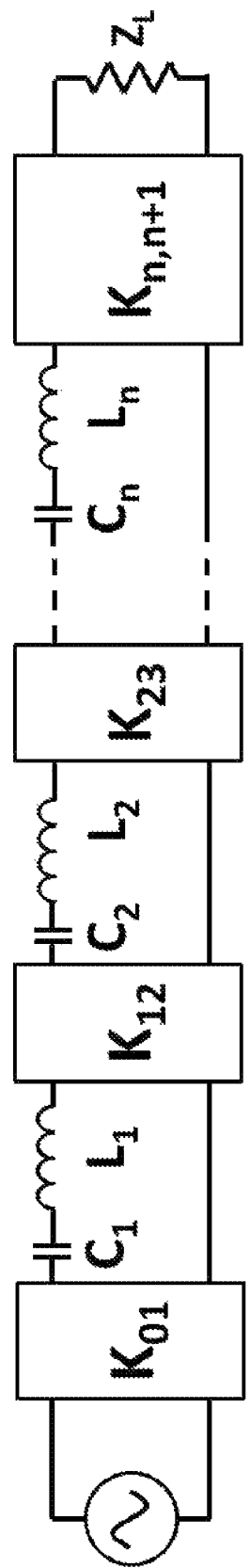
FIGS. 9 and 10 represent schematic drawings of magnetic resonance coupling (MRC) circuit with repeaters according to the present disclosure.
Figure 10:
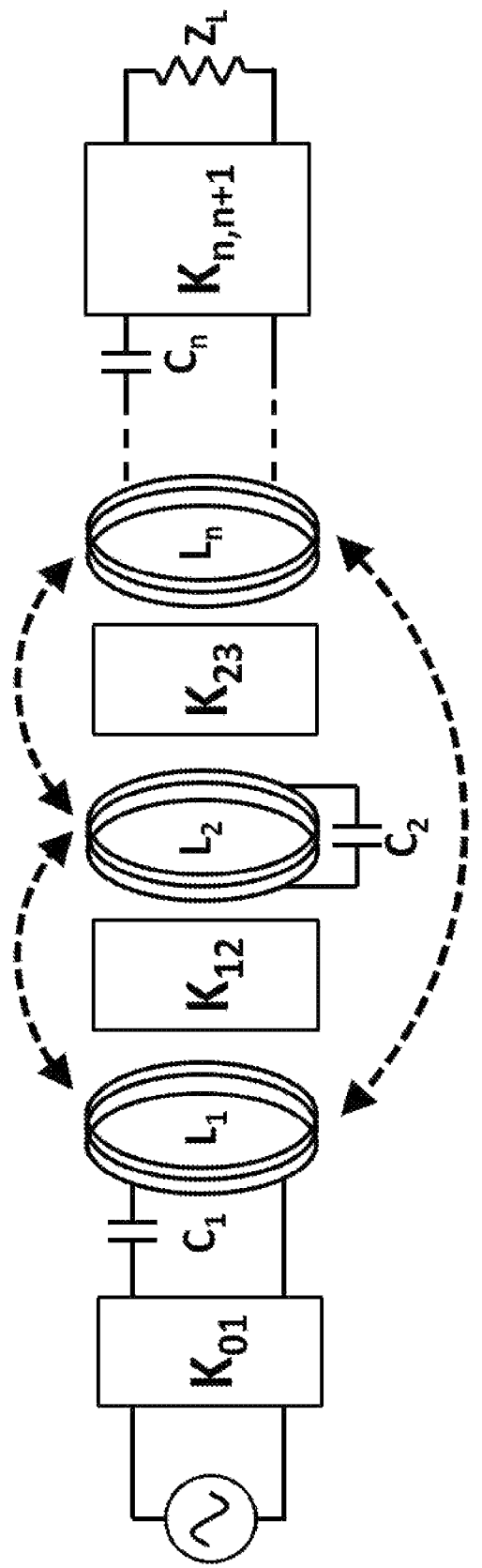

The method and system described herein can also be expanded to account for repeaters. While 2 resonators have been shown, the number of resonators can be N+2 where +2 represents the source and load resonators. Referring to FIGS. 9 and 10 two schematic drawings are presented that depict repeaters in an MRC system. In this case the coupling matrix (provided below in Table II) will be updated to account for the number of resonators greater than 2. The transfer function of this updated N+2 set of resonator can then be solved (with N>2 resonators; numerical methods are more practical). An optimization algorithm can then be implemented to determine the external coupling M variables such that the transfer function is optimized (which represents optimal PTE). The optimal external coupling M variables are used to determine the optimal external coupling K-inverters. The external coupling K-inverters are manifested by a lumped element K-inverter network and thus optimal IM conditions can be realized.

TABLE II

Coupling Matrix for the case of repeaters

|   | S | 1 | 2 | n − 1 | n | L |
|---|---|---|---|---|---|---|
| S | 0 | $M_{S1}$ | $M_{S2}$ | $M_{S, n-1}$ | $M_{Sn}$ | $M_{SL}$ |
| 1 | $M_{1S}$ | $M_{11}$ | $M_{12}$ | $M_{1, n-1}$ | $M_{1n}$ | $M_{1L}$ |
| 2 | $M_{2S}$ | $M_{21}$ | $M_{22}$ | $M_{2, n-1}$ | $M_{2n}$ | $M_{2L}$ |
| n − 1 | $M_{n-1, S}$ | $M_{n-1, 1}$ | $M_{n-1, 2}$ | $M_{n-1, n-1}$ | $M_{n-1, n}$ | $M_{n-1, L}$ |
| n | $M_{nS}$ | $M_{n1}$ | $M_{n2}$ | $M_{n, n-1}$ | $M_{nn}$ | $M_{nL}$ |
| L | $M_{LS}$ | $M_{L1}$ | $M_{L2}$ | $M_{L, n-1}$ | $M_{Ln}$ | 0 |

The invention has been described in detail with particular reference to certain preferred aspects thereof, but it will be understood that variations, combinations, and modifications can be effected by a person of ordinary skill in the art within the spirit and scope of the invention.

The invention claimed is:

1. A wireless power transfer system, comprising:
a first resonator having a first resonant frequency $\omega_{o1}$, a half power bandwidth $\Delta\omega_1$, and an unloaded quality factor $Qo_1=\omega_{o1}/\Delta\omega_1$ coupled through a first coupling circuit to a power source; and
a second resonator having a second resonant frequency $\omega_{o2}$, a half power bandwidth $\Delta\omega_2$, and an unloaded quality factor $Qo_2=\omega_{o2}/\Delta\omega_2$ coupled through a second coupling circuit to a load, the first resonator disposed a distance away from the second resonator;
wherein the configuring of the first and second coupling circuits based on expressing transmission power from the first resonator to the second resonator as a function of external coupling with the source and external coupling with the load and determining partial derivatives of the transmission power with respect to the external couplings in order to find optimal external couplings and in order to find optimal characteristic impedance of the first and second coupling circuits,
wherein the partial derivatives of the transmission power with respect to the external couplings are governed by:

$$M_{S1opt} = \frac{M_{11}^{1/4}(M_{12tgt}^2 + M_{11}M_{22})^{1/4}}{M_{22}^{1/4}}$$

and $$M_{2Lopt} = \frac{M_{22}^{1/4}(M_{12tgt}^2 + M_{11}M_{22})^{1/4}}{M_{11}^{1/4}}$$

where, $M_{S1opt}$ is the optimal external coupling between the source and the first resonator,
$M_{11}$ and $M_{22}$ are normalized self-coupling terms of the first and second resonators,
$M_{12}$ is the inter-resonator coupling,
$M_{2Lopt}$ is the optimal external coupling between the second resonator and the load, and
$M_{12tgt}$ is a user-specified inter-resonator coupling, the optimal characteristic impedance are governed by:

$$K_{S1opt} = (1 + k_{12tgt}^2 Q_{01}Q_{02})^{1/4} \sqrt{\frac{50L_1\omega_0}{Q_{01}}}$$

and $$K_{2Lopt} = (1 + k_{12tgt}^2 Q_{01}Q_{02})^{1/4} \sqrt{\frac{50L_2\omega_0}{Q_{02}}}$$

where, $k_{12tgt}$ is the user specified inter-resonator coupling coefficient,
$L_1$ is the inductance of the first resonator, and
$L_2$ is the inductance of the second resonator.

2. The wireless power transfer system of claim 1, optimal characteristic impedance of the first and second coupling circuits are used to find lumped parameter values for components of the first and second coupling circuits.

3. The wireless power transfer system of claim 2, wherein the lumped parameter values for components of the first and second coupling circuits are governed by:

$$-C_{sn} = \frac{R_{out}}{K\omega_0\sqrt{-K^2 + R_{out}^2}}$$

and $$C_{pn} = \frac{\sqrt{-K^2 + R_{out}^2}}{R_{out}K\omega_0}$$

where, $-C_{sn}$ and $C_{pn}$ are lumped capacitors forming a lumped element capacitive K-inverter having a characteristic impedance K and an output resistance $R_{out}$, and where the $-C_{sn}$ and $C_{pn}$ are determined for the first and second coupling circuits.

4. The wireless power transfer system of claim 1, the first and second coupling circuits are re-configured to continue to provide a maximum power transfer efficiency between the first and second resonators as the distance between the first and second resonators change.

5. A method of providing a maximum wireless power transfer efficiency between a first resonator and a second resonator, comprising:
providing a first resonator having a first resonant frequency $\omega_{o1}$, a half power bandwidth $\Delta\omega_1$, and an unloaded quality factor $Qo_1=\omega_{o1}/\Delta\omega_1$ coupled through a first coupling circuit to a power source;
providing a second resonator having a second resonant frequency $\omega_{o2}$, a half power bandwidth $\Delta\omega_2$, and an unloaded quality factor $Qo_2=\omega_{o2}/\Delta\omega_2$ coupled through a second coupling circuit to a load, the first resonator disposed a distance away from the second resonator;
wherein the configuring of the first and second coupling circuits based on expressing transmission power from the first resonator to the second resonator as a function of external coupling with the source and external coupling with the load and determining partial derivatives of the transmission power with respect to the external couplings in order to find optimal external couplings and in order to find optimal characteristic impedance of the first and second coupling circuits,
wherein the partial derivatives of the transmission power with respect to the external couplings are governed by:

$$M_{S1opt} = \frac{M_{11}^{1/4}(M_{12tgt}^2 + M_{11}M_{22})^{1/4}}{M_{22}^{1/4}}$$

and $$M_{2Lopt} = \frac{M_{22}^{1/4}(M_{12tgt}^2 + M_{11}M_{22})^{1/4}}{M_{11}^{1/4}}$$

where, $M_{S1opt}$ is the optimal external coupling between the source and the first resonator,
$M_{11}$ and $M_{22}$ are normalized self-coupling terms of the first and second resonators,
$M_{12}$ is the inter-resonator coupling,
$M_{2Lopt}$ is the optimal external coupling between the second resonator and the load, and
$M_{12tgt}$ is a user-specified inter-resonator coupling, the optimal characteristic impedance are governed by:

$$K_{S1opt} = (1 + k_{12tgt}^2 Q_{01}Q_{02})^{1/4} \sqrt{\frac{50L_1\omega_0}{Q_{01}}}$$

and $$K_{2Lopt} = (1 + k_{12tgt}^2 Q_{01}Q_{02})^{1/4} \sqrt{\frac{50L_2\omega_0}{Q_{02}}}$$

where, $k_{12tgt}$ is the user specified inter-resonator coupling coefficient,
$L_1$ is the inductance of the first resonator, and
$L_2$ is the inductance of the second resonator.

6. The wireless power transfer system of claim 5, wherein finding optimal characteristic impedance of the first and second coupling circuits are used to find lumped parameter values for components of the first and second coupling circuits.

7. The method of claim 6, wherein the lumped parameter values for components of the first and second coupling circuits are governed by:

$$-C_{sn} = \frac{R_{out}}{K\omega_0 \sqrt{-K^2 + R_{out}^2}}$$

and $$C_{pn} = \frac{\sqrt{-K^2 + R_{out}^2}}{R_{out}K\omega_0}$$

where, $-C_{sn}$ and $C_{pn}$ are lumped capacitors forming a lumped element capacitive K-inverter having a characteristic impedance K and an output resistance $R_{out}$, and where the $-C_{sn}$ and $C_{pn}$ are determined for the first and second coupling circuits.

8. The method of claim 7, wherein $Q_{o1}$ and $Q_{o2}$ is less than 100.

9. The system of claim 1, wherein $Q_{o1}$ and $Q_{o2}$ is less than 100.

* * * * *